3,055,940
PREPARATION OF NITRODIPHENYLAMINES BY CATALYZED CONDENSATION
Paul L. Merz, Naugatuck, Conn., assignor to United States Rubber Company, New York, N.Y., a corporation of New Jersey
No Drawing. Filed Nov. 5, 1957, Ser. No. 694,499
6 Claims. (Cl. 260—576)

This invention relates to a new and improved process for preparing compounds of the type

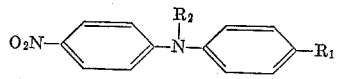

where $R_1$ is hydrogen, alkyl, nitro, halogen, aryloxy or alkoxy; $R_2$ being hydrogen. Exemplary of such are p-nitrodiphenylamine, 4-nitro-4'-alkyl-diphenylamine and 4,4'-dinitrodiphenylamine.

Compounds of this type are valuable intermediates for the preparation of antioxidants for rubber, oil and gasoline. They are also valuable dye stuff intermediates, particularly for fur dyes.

An earlier method of synthesizing p-nitrodiphenylamine is by refluxing aniline and p-nitrochlorobenzene in the presence of an alkali-metal carbonate and a copper catalyst. Such a procedure is described in British Patent No. 24,091, German Patent No. 185,663, and French Patent No. 381,230, attributed to I. Goldberg.

The disadvantage of the Goldberg synthesis is that the amount of p-nitrodiphenylamine produced is no small (ca. 1% of theory) as to make the process non-commercial. In my pending application Serial No. 551,579, filed December 7, 1955, now Patent No. 2,927,943, issued March 8, 1960, it is disclosed that the yield of the desired p-nitrodiphenylamine is increased some 70 fold by continuously removing all water including that formed by the neutralization of the liberated hydrogen chloride by the carbonate acid-acceptor. Good yields of p-nitrodiphenylamine of acceptable purity are obtained by the process described in the above mentioned patent application. This process, however, still suffers from several disadvantages, principally the long reaction time (ca. 20 hours) and being limited to the preparation of only p-nitrodiphenylamine itself.

I have now discovered that by carrying out the reaction in the presence of moderate amounts of amides, such as dimethyl formamide or hexamethylphosphoramide, the rate of reaction is accelerated to such an extent that the desired reaction is completed in as little as one-seventh of the time, i.e., in as little as three hours. The yield and purity of the p-nitrodiphenylamine produced is substantially unchanged by the presence of the amide solvent.

The following examples illustrate the improvement achieved by the amide solvents in accelerating formation of the desired p-nitrodiphenylamine:

*Example 1*

One mole proportion of p-nitrochlorobenzene, 2 moles of aniline, 0.66 mole of dimethyl formamide, 0.7 mole of potassium carbonate, and 0.01 mole of cuprous iodide were charged into a 1-liter, 3-neck flask equipped with thermometer, motor-driven stirrer, addition funnel and vertical air-cooled fractionating column. The top of the fractionating column was fitted with a simple distillation head leading to a water-cooled take-off condenser. The reaction mixture was boiled for 3 hours. During this time the boiling temperature increased from 184° C. to 193° C., and 0.53 mole of water was distilled off as a water-aniline azeotrope.

After cooling to 35° C., the inorganic residue, consisting of potassium chloride and potassium carbonate, was filtered off and washed with a small amount of acetone or benzene. The combined organic filtrates were separated by simple vacuum distillation. 0.77 mole of quite pure p-nitrodiphenylamine; M.P. 129° C.–133° C. (literature 132° C.–133° C.); together with 0.145 mole of unchanged p-nitrochlorobenzene was obtained. Thus a 77% yield of good usable p-nitrodiphenylamine was obtained after only 3 hours reaction time, and of the p-nitrochlorobenzene reacting, 90% was converted to the desired p-nitrodiphenylamine.

*Example 2*

A reaction mixture identical with that described above in Example 1, except that the 0.66 mole of dimethyl formamide was replaced by 0.33 mole of hexamethylphosphoramide, was charged into the same 1-liter reaction flask assembly of Example 1. The reaction mixture was boiled at 200° C. to 210° C. for 4 hours. 0.5 mole of water boiled off during this time.

The reaction mixture was allowed to cool to room temperature, the inorganic residue filtered off and washed with an organic solvent (acetone). The organic filtrate was steam blown to remove solvent, unreacted aniline and p-nitrochlorobenzene. The green-colored crystalline residue was impure p-nitrodiphenylamine; M.P. 100° C.–130° C.; amounting to 78½% of the theoretical yield. By simple vacuum distillation of the above crude product a good yield of very pure p-nitrodiphenylamine; M.P. 132° C.–134° C.; was obtained.

In addition to strongly accelerating the reaction, I have found that the presence of these amides permits a wide variety of aniline derivatives to be successfully condensed with p-nitrochlorobenzene to furnish good yields of the corresponding p-nitrodiphenylamine derivative. As is illustrated by Example 3 below, only extremely poor yields of 4-nitro-4'-methyl-diphenylamine are obtained when aniline is replaced by p-toluidine in the process described in my earlier patent application Serial No. 551,579, or by the original Goldberg process, but with no amide promoter.

*Example 3*

One mole proportion of p-nitrochlorobenzene, 3 moles of p-toluidine, 0.7 mole of potassium carbonate, 0.01 mole of cuprous iodide were charged into a 1-liter, 3-neck flask equipped with thermometer, motor-driven stirrer, and addition funnel. Water was removed via a benzene filled Dean-Stark Trap equipped with a reflux condenser. The reaction mixture was boiled at 185° C. to 192° C. for 27 hours. 0.5 mole of water distilled over during this time.

The reaction mixture was cooled and the inorganic salts filtered off. These salts analyzed 25% potassium chloride and 75% potassium carbonate, thus showing that considerable reaction had taken place. The organic filtrate was blown with steam to remove the unreacted p-toluidine and p-nitrochlorobenzene. Less than a 4% yield of the desired 4-nitro-4'-methyl-diphenylamine could be isolated from the steamed residue even though both fractional crystallization and chromatographic adsorption analysis (see Encyclopedia of Chemical Technology, Kirk-Otmer, volume 3, page 928, Interscience, 1949) from benzene solution on alumina were employed. Thus, in the absence of the promoting amide solvents, dimethyl formamide or hexamethylphosphoramide -toluidine and p-nitrochlorobenzene yield complex mixtures of unknown products, many of which melt above 150° C.

By introducing a relatively small amount of the promoting amide solvent into the above reaction mixture, the yield of the desired 4-nitro-4'-methyl-diphenylamine is increased 80 fold. The reaction is "clean-cut" and very little by-products are formed. The effect of the amide solvent, dimethyl formamide, is illustrated below in Example 4.

Example 4

A reaction mixture identical with that described above in Example 3, except that the 3 moles of p-toluidine were replaced by 2 moles of p-toluidine plus 0.66 mole of dimethyl formamide, was charged into the same 1-liter reaction assembly employed in Example 3. This reaction mixture was boiled for 6 hours at 188° C.–190° C. Approximately 0.5 mole of water distilled off during the course of the reaction.

As in Example 2, the reaction mixture was filtered at room temperature to remove the inorganic residue. The organic filtrate was blown with steam to remove the unchanged solvent, p-toluidine and p-nitrochlorobenzene. The crystalline residue of impure 4-nitro-4'-methyl-diphenylamine amounted to 82% of theory. By simple recrystallization from methanol, 4-nitro-4'-methyl-diphenylamine; M.P. 135° C.–138° C. (literature 139° C.) was obtained.

Other alkyl anilines (such as p-ethyl aniline, p-cumidine, etc.) may be similarly condensed with p-nitrochlorobenzene by this same process to give satisfactory yields of the corresponding 4-nitro-4'-alkyl diphenylamine. This is illustrated for p-cumidine in Example 5 below.

Example 5

0.75 mole of p-nitrochlorobenzene, 1.12 moles of p-cumidine, 0.85 mole of anhydrous potassium carbonate, 0.37 mole of dimethyl formamide and 0.0058 mole of cuprous iodide were charged into a 1-liter 3-neck flask equipped with thermometer, motor-driven stirrer and addition funnel. The reaction mixture was heated at 200° C. for 5 hours during which time 80 ml. of a water-dimethyl formamide azeotrope was removed via a fractionating column operating at 100° C.–130° C.

As in Example 1, the inorganic residue was filtered off and the desired product, 4-nitro-4'-isopropyldiphenylamine; M.P. 105° C.–106° C., isolated by simple vacuum distillation. The overall yield was in excess of 50% of theory.

The promoting effect of the amide solvent is not limited solely to promoting the reaction of aniline and its simple alkyl homologs, but is also applicable to aniline derivatives containing a second functional group (such as nitro, chloro and alkoxy groups) providing the second functional group is not more reactive toward p-nitrochlorobenzene than the amine group. Thus, compounds such as p-hydroxyaniline are specifically excluded from this process. A typical reaction involving the preparation of 4,4'-dinitrodiphenylamine is illustrated below.

Example 6

One mole proportion of p-nitrochlorobenzene, 1 mole of p-nitroaniline, 0.7 mole of potassium carbonate, 0.005 mole of cuprous iodide, and 0.66 mole of dimethyl formamide were charged into the usual 1-liter 3-neck flask assembly equipped with a Dean-Stark Trap for water removal. The reaction mixture was boiled for 2.25 hours at 197° C. to 205° C. Six-tenths of a mole of water was evolved during this period.

After cooling to room temperature the solid reaction mixture was ground up and extracted with hot acetone to separate the inorganic salt from the organic fractions. The extract was evaporated to dryness and blown with steam to remove all unreacted p-nitrochlorobenzene. By extraction and fractional crystallization of the steamed residue, pure 4,4'-dinitrodiphenylamine; M.P. 210° C.–213° C. (literature, M.P. 214° C.) was obtained in 50% of the theoretical yield.

As little as one-twentieth mole proportion of the promoting amide solvents, per mole proportion of p-nitrochlorobenzene have a desirable accelerating effect on the condensation reactions under discussion. As high as 2 mole proportions of amide solvent may be employed, although at higher concentrations the reaction becomes less "clean-cut," i.e., more undesirable by-products are formed. The optimum concentration of the amide solvent varies, depending on both the nature of the aromatic amine component and the nature of the amide solvent. In the great majority of cases the optimum concentration lies between one-twentieth and 2 mole proportions per mole proportions of p-nitrochlorobenzene. For these specific cases in which the aromatic amine component is aniline, p-nitroaniline or p-alkyl aniline, the preferred concentration of the amide solvent lies between one and one-tenth mole proportions.

The promoting amide solvents do not appear to affect the character of the condensation reaction, but only increase the rate of reaction and broaden its applicability to a wider range of aromatic amines. The effect of variations in reaction conditions on the yield and purity of product, therefore, is the same for reactions carried out in the presence as in the absence of the promoting amine solvents. Salient conditions (previously cited for aniline in my copending application Serial No. 551,579) which are applicable are:

(a) Maintenance of an anhydrous reaction mixture by continuously distilling off the water evolved by the hydrogen chloride-potassium carbonate reaction.

(b) It is advantageous to stop the reaction after the theoretical quantity of water has been distilled off.

(c) The mole ratio of aniline (or substituted aniline) to p-nitrochlorobenzene may vary from 1 to 9.

(d) The mole ratio of potassium carbonate to p-nitrochlorobenzene may vary from 0.5 to 1.

(e) Any suitable copper catalyst (copper chloride, sulfate, etc.) may be used.

Having thus described my invention, what I claim and desire to protect by Letters Patent is:

1. In the process of preparing compounds represented by the formula

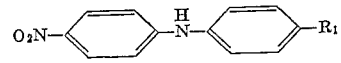

by reacting 1 mole of p-nitrochlorobenzene with 1–9 moles of an aromatic compound of the formula

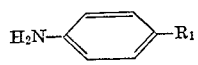

$R_1$ being a radical selected from the group consisting of hydrogen, alkyl, nitro, and chlorine; in the presence of ½ to 1 mole of potassium carbonate as the hydrochloric acid acceptor and a catalytic amount of copper salt, in the temperature range of from about 170° C. to about 210° C., while maintaining the reaction in an anhydrous condition by continuously distilling off all of the water including that formed by the neutralization of the liberated hydrochloric acid with the potassium carbonate, the improvement of promoting the reaction by the addition of from 1/20 to 2 moles of an amide selected from the group consisting of dimethyl formamide and hexamethylphosphoramide per mole of p-nitrochlorobenzene.

2. A process as in claim 1, wherein the aromatic compound reactant is aniline.

3. A process as in claim 1, wherein the aromatic compound reactant is p-nitroaniline.

4. A process as in claim 1, wherein the aromatic compound reactant is p-alkyl aniline.

5. A process as in claim 1, wherein the aromatic compound reactant is p-toluidine.

6. A process as in claim 5, wherein the amide is dimethyl formamide.

References Cited in the file of this patent

UNITED STATES PATENTS 2,078,527    Clifford _____ Apr. 27, 1937

(Other references on following page)

UNITED STATES PATENTS

| | | |
|---|---|---|
| 2,558,285 | Wilson | June 26, 1951 |
| 2,572,067 | Smith | Oct. 23, 1951 |
| 2,769,002 | Buisson et al. | Oct. 30, 1956 |
| 2,837,518 | Jacob et al. | June 3, 1958 |
| 2,888,459 | Jacob et al. | May 26, 1959 |
| 2,924,620 | Miller | Feb. 9, 1960 |
| 2,927,943 | Merz | Mar. 8, 1960 |

OTHER REFERENCES

Bergstrom et al.: Journal of Organic Chemistry, vol. 1, pages 170 and 171 relied on (1936).

Kornblum et al.: Journal of the American Chemical Society, vol. 74, page 5782 (1952).